No. 617,487.  
F. J. KELLER.  
TOASTER, BROILER, &c.  
(Application filed Dec. 18, 1897.)  
Patented Jan. 10, 1899.
(No Model.)
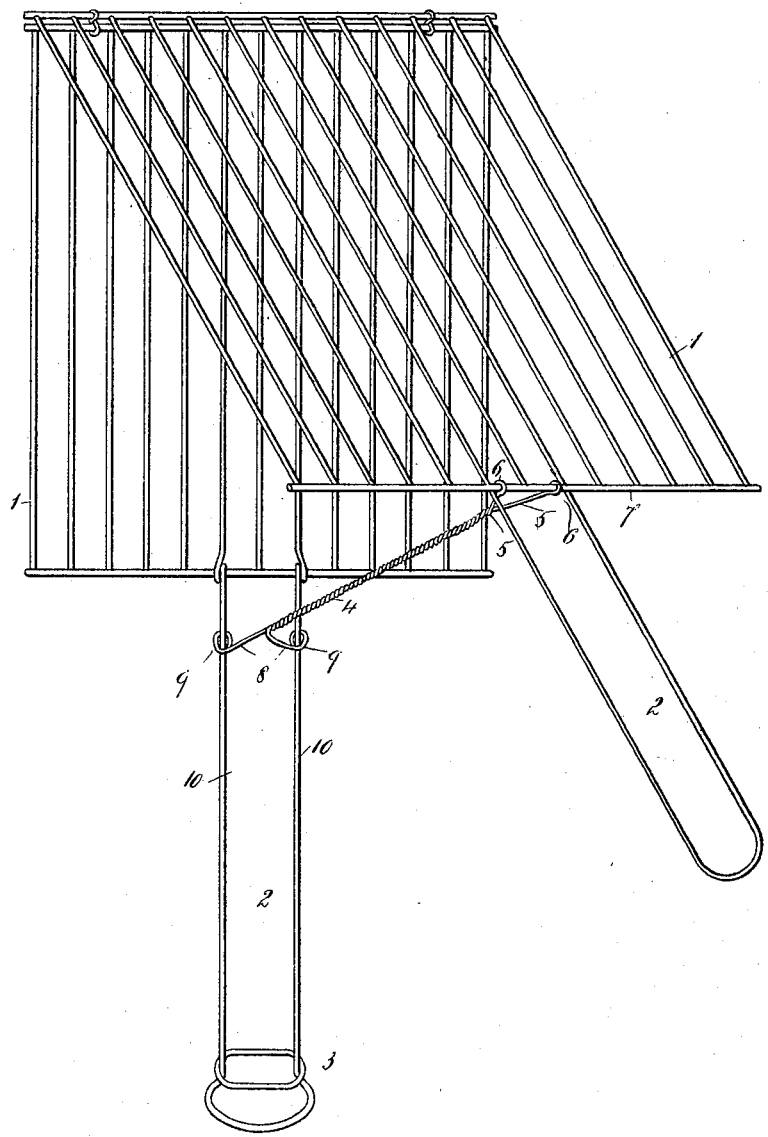
WITNESS  
John Buckler,  
L. W. Muller
INVENTOR  
Fernando J. Keller,  
BY  
Edgar Tate & Co.  
ATTORNEYS

UNITED STATES PATENT OFFICE.

FERNANDO JOSEPH KELLER, OF ROCHESTER, NEW YORK.

TOASTER, BROILER, &c.

SPECIFICATION forming part of Letters Patent No. 617,487, dated January 10, 1899.

Application filed December 18, 1897. Serial No. 662,447. (No model.)

*To all whom it may concern:*

Be it known that I, FERNANDO JOSEPH KELLER, a citizen of the United States, residing at Rochester, in the county of Monroe and State of New York, have invented certain new and useful Improvements in Toasters, Broilers, and the Like, of which the following is a full and complete specification, such as will enable those skilled in the art to which it appertains to make and use the same.

The object of this invention is an improvement in toasters, broilers, and the like that comprise two pivoted sections; and it consists of an attachment which holds the parts separated and allows them to readily close.

The invention is fully disclosed in the following specification, of which the accompanying drawing forms a part, said drawing being a perspective view of a toaster provided with this improvement.

In the drawing forming part of this specification, 1 indicates the frames, 2 the handles, and 3 the fastening-ring, of an ordinary toaster. This invention consists of a bar 4, pivotally secured to one frame or handle and having a sliding connection with the other. When the device is closed, this bar extends longitudinally with the handles, but when opened one end slides along the handle to the position shown in the drawing and obviously holds the members separated.

In using the ordinary toaster it is customary to place it upon a table and hold the upper member in an elevated position with one hand while placing therein or removing the bread with the other or in some other manner, necessitating placing it upon a table or the like. With the improvement, however, by holding the toaster in the left hand the right hand can lift the upper frame, and since the bar 4 holds it in this position the right hand can place and remove toast and the like, and then by sliding the end of the bar along the handle the frames can be again closed and locked. In this way the work is facilitated and made easy and convenient, since it obviates the necessity of resting the device upon a support, as is obvious.

In the particular construction illustrated the bar 4 has two arms 5 at one end, provided with eyes 6, pivoted to the cross-piece 7 of one frame, while at the other end are two arms 8, having eyes 9, through which the side pieces 10 of the handle of the other frame pass. It is understood, however, that this construction is simply an advantageous arrangement for this particular construction of toaster or broiler, that it can be modified to adapt it to other forms, and that, except in the claims for the specific construction, the invention is not confined to the details of construction shown.

Having fully described my invention, I claim as new and desire to secure by Letters Patent—

1. A broiler or toaster, comprising two frames, which are hinged together at one end, and each of which is provided at its free end with a projecting handle, and a spreader one end of which is provided with a swinging connection with the free end of one of said frames, and the other end of which is connected with and adapted to slide on the handle of the other frame, substantially as shown and described.

2. The combination with a toaster, broiler or the like having two pivoted frames provided with handles, of a bar having two arms at one end pivoted to the cross-piece of one frame by eyes on the ends of said arms, and two arms at the other end of said bar having eyes through which the side pieces of the handle of the other frame slides, substantially as set forth.

In testimony that I claim the foregoing as my invention I have signed my name, in presence of the subscribing witnesses, this 16th day of December, 1897.

FERNANDO JOSEPH KELLER.

Witnesses:
 JOHN B. KELLER,
 MARIE MEINHARD.